United States Patent [19]

Strazik et al.

[11] 4,293,461
[45] Oct. 6, 1981

[54] UNSATURATED MELAMINE CONDENSATES

[75] Inventors: William F. Strazik; John R. LeBlanc, both of Wilbraham; J. Owen Santer, East Longmeadow, all of Mass.

[73] Assignee: Monsanto Company, St. Louis, Mich.

[21] Appl. No.: 157,720

[22] Filed: Jun. 9, 1980

[51] Int. Cl.³ .............................................. C08L 91/00
[52] U.S. Cl. .................................. 260/18 N; 260/21; 260/22 CQ; 260/22 CB; 525/157; 525/518; 528/230; 528/254
[58] Field of Search ................. 260/18 N, 21, 22 CQ, 260/22 CB; 525/157, 518; 528/230, 254

[56] References Cited

U.S. PATENT DOCUMENTS

| | | | |
|---|---|---|---|
| 2,885,382 | 5/1959 | Zuppinger et al. | 260/45.2 |
| 2,986,541 | 5/1961 | Zuppinger et al. | 260/21 |
| 3,020,255 | 2/1962 | Magrane et al. | 260/40 R |
| 3,535,148 | 10/1970 | Rarre | 117/93.31 |
| 3,830,782 | 8/1974 | Kempter et al. | 260/21 |
| 3,839,289 | 10/1974 | Waitkus | 260/64 |
| 3,887,637 | 6/1975 | Waitkus | 260/29.4 R |

*Primary Examiner*—Lucille M. Phynes
*Attorney, Agent, or Firm*—R. Bruce Blance; William J. Farrington; Edward P. Grattan

[57] ABSTRACT

An unsaturated condensate of a methylolmelamine, an acrylamide, an unsaturated fatty acid amide and optionally a $C_1$ to $C_{10}$ alcohol, wherein the methylolmelamine has at least about 5 methylol groups per melamine ring, wherein substantially all the methylol groups are condensed with acrylamide, unsaturated fatty acid amide or alcohol, wherein the number of acrylamide moieties of the condensate is in the range of about 1 to about 4 per melamine ring and the number of unsaturated fatty acid amide moieties is in the range of about 0.5 to about 2 per melamine ring and wherein the ratio of acrylamide moieties to unsaturated fatty acid amide moieties is in the range of about 1:1 to about 3:1. The unsaturated condensates are used in high solids unsaturated coating systems containing unsaturated oil-modified resins.

22 Claims, No Drawings

UNSATURATED MELAMINE CONDENSATES

This invention relates to unsaturated melamine condensates obtained from condensation of a methylolmelamine, an acrylamide, an unsaturated fatty acid amide and a lower alcohol and to a process for the preparation of such condensates. More particularly it is directed to condensates of a methylolmelamine containing at least five methylol groups per melamine ring, acrylamide, an unsaturated fatty acid amide and a $C_1$ to $C_{10}$ alcohol and to a process for the preparation of such condensates.

Recent anti-pollution legislation is causing the coatings industry to develop coating compositions high in solids in order to reduce solvent emission upon application and drying of the compositions. Alkyd manufacturers have tried to increase the solids/viscosity ratio of their products by reducing the molecular weight of the alkyd. While this approach has been successful in raising the solids of air dry alkyd paints, it has produced some undesirable side effects in the resulting coatings; namely, lower hardness, solvent resistance and water resistance, and longer tack free and cure times. The use of conventional aminoplast crosslinkers fails to improve these properties in air dry alkyd coatings.

The present invention provides unsaturated melamine condensates which are useful as crosslinkers of unsaturated oil-modified resins such as those used in high solids alkyd coatings, allowing them to be air-dried more rapidly to hard, solvent and water resistant coatings. The unsaturated melamine condensates are condensates of a methylolmelamine with an acrylamide, an unsaturated fatty acid amide and optionally a $C_1$ to $C_{10}$ alcohol wherein the methylolmelamine has at least about five methylol groups per melamine ring, wherein substantially all the methylol groups are condensed with acrylamide, unsaturated fatty acid amide or alcohol, wherein the number of acrylamide moieties of the condensate is in the range of about 1 to about 4 per melamine ring and the number of unsaturated fatty acid amide moieties is in the range of about 0.5 to about 2 per melamine ring and wherein the ratio of acrylamide moieties to unsaturated fatty acid amide moieties is in the range of about 1:1 to about 3:1, and wherein the unsaturated fatty acid amide is an amide of ammonia or methylamine and an ethylenically unsaturated fatty acid containing from 4 to 32 carbon atoms and at least one allylic hydrogen atom per fatty acid moiety. Another aspect of the invention is directed to a process for the preparation of the condensates which comprises reacting an acrylamide and an unsaturated fatty acid amide with an alkoxymethylmelamine at a temperature below about 120° C. in the presence of an acid catalyst until an amount of alcohol about equivalent to the acrylamide and the unsaturated fatty acid amide is evolved.

The alkoxymethylmelamine is a methylolated, etherified melamine obtained by reaction of formaldehyde and melamine under conditions well known in the art to minimize the amount of oligomerization which can occur when methylene or methylene ether bridges are formed by intercondensation of methylol groups, followed by etherification with an alcohol or mixture of alcohols. The combined ratio of formaldehyde to melamine in the alkoxymethyl melamine is in the range of about 5:1 to about 6:1 and the combined ratio of the etherifying alcohol is in the range of about 4.7 to about 6.0 moles per mole of melamine. The etherifying alcohol is preferably selected from the group consisting of methyl, ethyl, propyl, isopropyl, butyl and isobutyl alcohols, and mixtures thereof and mixtures with higher alcohols containing up to 10 carbon atoms. However the amount of $C_1$ to $C_4$ alkoxy groups is preferably at least stoichiometric with the acrylamide and ethylenically unsaturated fatty acid amide condensing agents to allow ready displacement of alkoxy by the amide groups. The preferred etherifying alcohol is methyl alcohol because its volatility and low boiling point allow its more ready displacement from the alkoxymethylmelamine. The average degree of oligomerization of the alkoxymethylmelamine is about 3 or less and is preferably less than about 2.

Alternatively the unsaturated condensate of the present invention can be obtained by condensation of a methylolmelamine with the appropriate amount of the acrylamide, the ethylenically unsaturated fatty acid amide and a $C_1$ to $C_{10}$ alcohol to obtain the desired condensate ratio. The methylolmelamine preferably contains at least about five methylol groups per melamine ring and is obtained by reaction of formaldehyde and melamine under conditions well known in the art to minimize the amount of oligomerization which can occur by formation of methylene or methylene ether bridges. The average degree of oligomerization is preferably less than about 2 and preferably the methylolmelamine is the substantially fully methylolated melamine with a degree of methylolation of about 6. Substantially all the methylol groups are considered to have been condensed with the acrylamide, the unsaturated fatty acid amide and the alcohol when at least about 80 percent and preferably at least about 90 percent have been condensed therewith. When the alcohol is a $C_1$ to $C_4$ alcohol, it can be added in excess to help reduce the tendency of the methylolmelamine to self-condense. The excess can be distilled when the condensation with amides and alcohol is complete. Because of its greater volatility, methyl alcohol is the preferred alcohol. When the desired alkoxymethyl groups are derived from a higher alcohol, a $C_1$ to $C_4$ alcohol may be used as solvent for the reaction and is stripped from the reaction mixture when the amide condensation is complete, allowing the desired product to be recovered. Instead of a lower alcohol, any inert, low boiling solvent for the reactants and the reaction product may be used as the reaction solvent. Preferably the boiling point of the solvent is 150° C. or less and more preferably it is 100° C. or less.

The acrylamide which is used in the condensation can be represented by the formula:

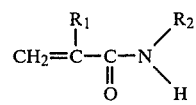

where $R_1$ and $R_2$ are selected from the group consisting of H and methyl. The preferred acrylamide is acrylamide in which $R_1$ and $R_2$ are both hydrogen.

The ethylenically unsaturated fatty acid amide is an amide of ammonia or methylamine and a $C_4$ to $C_{32}$ ethylenically unsaturated fatty acid containing at least one allylic hydrogen atom i.e. at least one hydrogen atom bonded to a carbon adjacent to an ethylenic double bond. Preferably the amide is a primary amide obtained by reaction of ammonia and unsaturated fatty acid. The amide can be obtained by direct reaction of the ammonia or methylamine with the unsaturated fatty acid or by indirect reaction for example via the corresponding acid chloride, acid anhydride, ester or nitrile. The unsaturated fatty acids which may be used for preparation of the amides include mono-unsaturated fatty acids such as crotonic acid, 4-hexenoic acid, 6-octenoic acid, 4-decenoic acid, caproleic acid, 10-undecylenic acid, lauroleic acid, physeteric acid, myristoleic acid, palmitoleic acid, petroselinic acid, petroselaidic acid, oleic acid, elaidic acid, vaccenic acid, gadoleic acid, cetoleic acid, erucic acid, brassidic acid, selacholeic acid, ximinic acid and lumequoic acid, and polyunsaturated fatty acids such as sorbic acid, linoleic acid, linolelaidic acid, hiragonic acid, α-eleostearic acid, β-eleostearic acid, punicic acid, linolenic acid, elaidolinolenic acid, psuedoeleostearic acid, moroctic acid, α-parinaric acid, β-parinaric acid, arachidonic acid, elupanodonic acid, and nisinic acid. Preferably at least about 5 weight percent of the acid is a polyunsaturated acid and more preferably at least about 10 weight percent is polyunsaturated. Preferably the unsaturated fatty acid contain 10 to 20 carbon atoms and is of the group which occurs in natural glyceride oils. Among the preferred acids are oleic acid, linoleic acid and linolenic acid and mixtures thereof.

The ratio of acrylamide moieties to ethylenically unsaturated fatty acid amide moieties in the unsaturated melamine condensate is preferably in the range of about 1:1 to about 3:1 so that when the unsaturated melamine condensate is incorporated into unsaturated alkyds it can reduce the viscosity of the system without substantially increasing the time required by the system to reach a tack-free state when it is allowed to dry in air. In general the unsaturated fatty acid amide moieties promote a reduction in viscosity of the system, the acrylamide moieties enhance the hardness of the air-dried coating and the acrylamide and unsaturated fatty acid amide moieties together enhance the rate of cure of the system. Preferably the number of acrylamide moieties per melamine ring is in the range of about 1 to about 4 and the number of ethylenically unsaturated fatty acid amide moieties is in the range of about 0.5 to 2. More preferably the number of acrylamide moieties is in the range of about 1 to about 3 and the number of ethylenically unsaturated fatty acid amide moieties is in the range of about 0.75 to about 1.5 per melamine ring, the remaining methylol groups being substantially condensed with the $C_1$ to $C_{10}$ alcohol forming alkoxymethyl groups.

In the condensation reaction of the melamine derivative and the amides, the temperature is maintained below about 120° C. to minimize polymerization reactions and in the initial stage of the reaction the temperature is preferably maintained below about 80° C. and atmospheric pressure is maintained to prohibit the removal of reactants before they have reacted. As the reaction proceeds, the volatile products generated by the condensation reaction such as water or lower alcohol are removed under reduced pressure and increased temperature.

The condensation reaction is carried out in the presence of a catalytic amount of an acid catalyst selected from the group consisting of protonic acids of pKa less than about 2 and Lewis acids. A catalytic amount is an amount which allows the reaction to be completed within a reasonable time, usually less than 24 hours at a selected temperature. The catalyst is generally added in an amount of from about 0.1 to about 5 weight percent, preferably from about 0.5 to about 2 weight percent of the reaction mixture. The protonic acids can be selected from the mineral acids hydrochloric, nitric and sulfuric acids, organic acids such as oxalic acid, trichloroacetic acid and trifluoroacetic acid, and sulfonic acids such as methanesulfonic acid, trifluoromethanesulfonic acid, benzenesulfonic acid and p-toluenesulfonic acid. The sulfonic acids are generally preferred since they are strong acids, readily soluble in the reaction medium and can be readily added without the addition of water. The Lewis acids can be selected from the group consisting of metal halides such as stannic chloride, aluminum chloride, ferric chloride and magnesium bromide, metal alkoxides such as aluminum isopropoxide, tetrapropyl titanate, tetrabutyl zirconate, and dipropyl diacetonyl titanate, metal salts of organic acids such as stannous octoate, stannic octoate and dibutyltin diacetate, boron compounds such as boron trichloride, boron trifluoride and boron trifluoride etherate and acid phosphates such as alkyl acid phosphates including methyl acid phosphate, butyl acid phosphate and phenyl acid phosphate. For high conversion, boron trifluoride, aluminum chloride, stannic chloride, and butyl acid phosphate are among the preferred Lewis acids.

To prevent polymerization or oxidation of the unsaturated melamine condensate, the acrylamide or the unsaturated fatty acid amide during the condensation reaction, a polymerization and oxidation inhibiting quantity of an inhibitor is added to the reaction mixture. Excess of inhibitor should be avoided since it can subsequently inhibit the polymerization of air-drying unsaturated oil-modified resins containing the unsaturated melamine condensate of the present invention, causing an excessively long induction period when the compositions are air-dried. Effective inhibitors include hydroquinone, ethers of hydroquinone, and quinone.

The unsaturated melamine condensates can be used with unsaturated vehicles to reduce the viscosity of coating systems containing such vehicles, and to improve the drying properties and hardness of the coatings. The condensates are especially useful with air-drying unsaturated or oil-modified resins of molecular weight about 10,000 or less and glass transition temperature in the range of about 0° to about 100° C. having an oil length in the range of about 15 to about 50%. The oil modified resins can be oil modified alkyd resins prepared from conventional polybasic acids, polyhydric alcohols and oil-modifying fatty acids, or oil-modified styrene allyl alcohol copolymers prepared by esterification of styrene allyl alcohol copolymers containing from about 2 to about 10 hydroxy groups per molecule with oil modifying fatty acid, or oil modified acrylic resins prepared by esterification of oil modifying fatty acid and low molecular weight hydroxy containing acrylic copolymers of glass transition temperature of about 25° C. or higher prepared by interpolymerization of $C_4$ to $C_{10}$ alkyl acrylates or $C_5$ to $C_{11}$ alkyl methacrylates with a hydroxy monomer selected from the group consisting of allyl alcohol, methallyl alcohol, and $C_5$ to $C_8$ hydroxy acrylates or hydroxy methacrylates such as 2-hydroxyethyl acrylate and 2-hydroxyethyl methacrylate, or oil-modified epoxy resins prepared by reaction of an oil-modifying fatty acid with an epoxy resin condensate of the diglycidyl ether of bisphenol A or an epoxidized polybutadiene. Preferred oil-modified resins are of molecular weight in the range of about 500 to about 8000, and glass transition temperature in the range of about 20° to about 60° C. and contain an oil modifying fatty acid comprising at least about 10 percent by weight of a polyunsaturated fatty acid such as sorbic acid, linoleic acid, linolelaidic acid, hiragonic acid, α-eleostearic acid, β-eleostearic acid, punicic acid, linolenic acid, elaidolinolenic acid, psuedoeleostearic acid, moroctic acid, α-parinaric acid, β-parinaric acid, arachidonic acid, elupanodonic acid, and nisinic acid. More preferably when the unsaturated melamine condensate is low in polyunsaturate content, the polyunsaturated fatty acid content of the oil-modified resin is preferably at least about 30 percent by weight and even more preferably, it is at least about 50 percent by weight of the oil modifying fatty acid. Accordingly, the preferred oil-modifying fatty acids are fatty acids separated from drying oils or semi-drying oils such as dehydrated castor oil fatty acid (a linoleic acid content of 76 to 88%), linseed oil fatty acid (a linoleic acid content of 15% and a linolenic acid content of 52%) and safflower oil fatty acid (a linoleic acid content of 72 to 80%) as well as linoleic acid, linolenic acid and a mixture of both. In the preparation of the oil-modified resins it is generally desirable to add a sufficient amount of a polymerization inhibitor such as hydroquinone to inhibit gelation during the oil modification.

Unsaturated oil modified resin compositions in combination with the unsaturated melamine condensates can contain from about 50 to about 95 parts by weight of the unsaturated oil-modified resin and from about 50 to 5 parts by weight of the unsaturated melamine condensate. Preferably the combination contains from about 70 to about 90 parts by weight of the unsaturated oil-modified resin and from about 30 to about 10 parts by weight of unsaturated melamine condensate. Too high levels of the unsaturated melamine condensate can cause longer times to reach a tack-free condition and deterioration of properties such as flexibility in the cured coating especially when the condensate contains high levels of acrylamide. When the level is too low no appreciable effect on the viscosity of the coating composition and the hardness and solvent resistance of the coating is obtained.

The air-drying compositions of the present invention comprising unsaturated alkyds and unsaturated melamine condensates may be formulated in any of the conventional solvents for such systems including aromatic hydrocarbons, aliphatic esters, and aliphatic ketones and mixtures thereof and mixtures containing aliphatic hydrocarbons. The solutions can be used at any dilution which is convenient for application of the coating compositions to a substrate. Preferably the solids of the coating compositions are greater than about 40 weight percent and even more preferably about 70 percent or greater since advantage can be taken of the ability of the unsaturated melamine condensate to reduce the viscosity of higher molecular weight unsaturated oil-modified resin.

The air-drying compositions containing unsaturated oil-modified resins and the unsaturated melamine condensates may be cured at room temperature by means of metal driers of heavy metals such as cobalt, manganese and zinc salts of naphthenic acid, neodecanoic acid and the like or by means of such metal driers in combination with the alkali metal salts of these acids. When the coating compositions are used as room-temperature drying paints, they are suitable for painting outdoor structures, and heavy machinery and equipment too bulky to be passed through drying ovens.

The unsaturated air-drying compositions may also be force-dried and cured at elevated temperatures of up to about 100° C. and more and such cure may be accelerated by conventional free radical catalysts such as peroxides and hydroperoxides and by redox systems such as benzoyl peroxide and dimethylaniline.

The coating composition can be modified by the addition of pigments, plasticizers, colorants, dyes, pigment dispersing agents, flow control agents, stabilizers and the like.

Other types of unsaturated vehicles which may be usefully combined with the unsaturated melamine condensates are polyesters containing internal unsaturation derived from maleic acid moieties and the like and pendant unsaturation provided by allylic or acrylic groups. Such polyester compositions are conveniently cured by free radical methods at elevated temperatures, and can include significant amounts of vinyl monomers such as acrylates, methacrylates and aromatic vinyl monomers such as styrene.

The following examples are set forth in illustration of the invention and should not be construed as a limitation thereof. Unless otherwise indicated, all parts and percentages are by weight.

EXAMPLE 1

This example describes the preparation of an unsaturated melamine condensate containing 2 acrylamide units and 1 ethylenically unsaturated fatty acid amide unit and 3 methoxy units per melamine ring.

To a kettle equipped with stirrer, thermometer, heating jacket and a vacuum outlet are charged the following:

337 parts hexamethoxymethylmelamine
150 parts acrylamide
292 parts of a mixture of 94% oleylamide and 6% linoleylamide
1.62 parts methanesulfonic acid
0.30 parts hydroquinone (0.2% by wt. on acrylamide)
0.15 parts quinone (0.1% by wt. on acrylamide)

The mixture is stirred under a nitrogen blanket and the temperature is increased to 80° C. to form a clear solution. At 80° C., a slight vacuum is applied. The temperature is gradually increased to 110° C. and the pressure is gradually decreased to 100 mm mercury over a 90 minute period to distil methanol formed by the condensation of the amides with the hexamethoxymethylmelamine. The product analyzed by thin layer chromatography contains less than 0.2% free acrylamide or fatty amide and practically no polymeric material. The product is diluted to 77 percent solids with methyl ethyl ketone and the solution is neutralized with 0.95 ml aqueous sodium hydroxide (50 wt. % solution). The neutralized product is filtered to remove precipitated salt. The viscosity of the solution is 1000 cps at 25° C.

EXAMPLES 1–15

By the procedure of example 1, the following examples of unsaturated melamine condensates are prepared from hexamethoxymethylmelamine.

TABLE 1

| | Unsaturated Melamine Condensates | | |
|---|---|---|---|
| Example | Acrylamide groups per melamine ring | Fatty Acid Amide groups per melamine ring | Fatty acid amide |
| 1 | 2 | 1 | 94% oleylamide |

TABLE 1-continued

Unsaturated Melamine Condensates

| Example | Acrylamide groups per melamine ring | Fatty Acid Amide groups per melamine ring | Fatty acid amide |
|---|---|---|---|
| 2 | 2 | 1 | 6% linoleylamide 84% oleylamide 16% linoleylamide |
| 3 | 2 | 0.75 | oleylamide |
| 4 | 2 | 1 | oleylamide |
| 5 | 2.5 | 1.5 | oleylamide |
| 6 | 3.5 | 2 | oleylamide |
| 7 | 1.5 | 0.75 | oleylamide |
| 8 | 2 | 1.5 | oleylamide |
| 9 | 1.5 | 1.5 | oleylamide |
| 10a | 2 | 0.75 | oleylamide |
| 11b | 2 | 1 | oleylamide |
| 13 | 2 | 0 | — |
| 14 | 1.0 | 0.5 | 84% oleylamide 16% linoleylamide |
| 15 | 2 | 1 | stearamide |
| 16 | 0.75 | 0.25 | 84% oleylamide 16% linoleylamide | a prepared from a methoxy/butoxy methylmelamine
b condensation catalyzed with butyl acid phosphate

EXAMPLE 1A

An air-drying curable resin composition is prepared by blending a 60 percent xylene solution of an oil modified unsaturated resin of molecular weight 6000 and oil length 35 with the unsaturated melamine condensate of example 1, cobalt neodecanoate and manganese octoate to obtain a 60 percent solids solution containing 48 weight percent oil modified unsaturated resin, 12 weight percent unsaturated melamine condensate, 0.07 weight percent cobalt neodecanoate and 0.035 weight percent of manganese octoate in a solvent blend containing xylene and methyl ethyl ketone in the weight ratio of 4:1. The viscosity of the solution is 354 cps. The coating solution is applied to phosphate treated steel panels and dried in air.

The following procedures are used to evaluate the coating composition:

Viscosity is determined by Brookfield Viscometer and Gardner-Holt Viscosity tube comparison at 25° C.

Formulation stability is determined by storing the formulations in clear Gardner-Holt viscosity tubes and/or in sealed 57 ml. jars (clear) at room temperature. The formulations are exposed to light and are tested periodically to determine any viscosity change.

Coating thicknesses on steel panels are determined by means of a GE thickness Gage Type B Model A 337AY2. Tack free times are determined in two ways:

(A) When the finger with a slight pressure will not leave a mark and the surface is not sticky to the touch.

(B) A strip of aluminum foil approx. 19 mm×76 mm, is smoothed and curled into a "C" shape by drawing the strip between a flat surface and a glass tube. One end of this curled foil strip is placed on the coating and held in place for 8 seconds with a 17 gram weight. If the foil rolls over when the weight is removed, the coating is judged tack free.

Coating hardness is determined by the standard pencil hardness testing procedure (ASTM D3363-74).

Solvent Resistance is determined by rubbing a felt tipped marker, the tip of which is saturated with methyl ethyl ketone, over the cured coating and determining the number of rubs necessary to penetrate or dissolve the coating, exposing the bare metal substrate. A single rub constitutes moving the MEK saturated marker across the coating and back over the same path to the starting point.

Cleveland Condensing Humidity Test is carried out according to ASTM D-2247-68 using a Cleveland Condensing Humidity Cabinet.

Coating flexibility is determined by means of the Gardner Falling Dart Impact Tester (failure is considered to have occurred if the coating shows any sign of cracking or crazing) and by the conical mandrel test (the angle at which the first crack appears is noted).

Durability is determined by exposing coatings on steel substrates to the weatherability cycle of the QUV Accelerated Weathering Tester (Q-Panel Company). Each cycle consists of 8 hours of condensation at 60° C. followed by 16 hours of ultraviolet at 65° C.

Data from the evaluation of Example 1A are presented in Table 2.

Air-drying Unsaturated Coating
Compositions—A-Series

Air-drying compositions similar to example 1A are prepared from the unsaturated melamine condensates of examples 2, 3, 5, 6, 14, 15 and 16 to provide a series of coating compositions containing unsaturated oil-modified resin and unsaturated melamine condensate in the weight ratio of 80 parts to 20 parts. Data for the evaluation of the coating compositions are presented in Table 2 along with data for Example 0A comprising the unsaturated resin without the unsaturated melamine condensate. The data show that the mixed unsaturates i.e. the melamine condensates containing both unsaturated fatty acid amide and acrylamide units cause significant decrease in viscosity of the coating systems and that the degree of improvement in other coating properties such as tack free time, hardness, rate of hardness development, solvent resistance, rate of solvent resistance development and water resistance depend on the actual amounts of the unsaturate fatty acid amide and acrylamide units present in the melamine condensate. In general, unsaturated melamine condensates containing a high acrylamide to fatty amide ratio are somewhat less compatible with the unsaturated oil-modified resin and in coating compositions containing the unsaturated oil-modified resins, the viscosity tends to be higher and the tack free time is reduced and the air dried coatings obtained from the coating compositions are more solvent resistant and somewhat less flexible. The total amount of amino-substitution has a lesser effect than the amide ratio on the properties of the coating compositions and air dried coatings. However, with increase in the total amido substitution there is a tendency towards decreased compatibility with the unsaturated oil-modified resin, decreased coating flexibility and condensing humidity resistance, and increased solvent resistance. In contrast, a saturated fatty amide (example 15) incorporated into the melamine condensate reduces compatibility and increases viscosity of the coating system, decreases adhesion and gloss and makes no contribution to solvent resistance of the air-dried coating.

TABLE 2

Evaluation of Air-drying Unsaturated Compositions A Series

| Coating Composition | 0A | 1A | 2A | 3A | 5A | 6A | 13A | 14 | 15A | 16 |
|---|---|---|---|---|---|---|---|---|---|---|
| Formulation Properties | | | | | | | | | | |
| Appearance | Clear | Clear | Clear | v.sl.haze | sl.haze | v.sl.haze | sl.hazy | clear | hazy | clear |
| Viscosity @25° C.(cps) | | | | | | | | | | |
| initial, 60% solids | 500 | 354 | 327 | 442 | 381 | — | — | 300 | — | 290 |
| 70% solids | — | 2500 | 2400 | — | — | 2500 | 2300 | — | 5500 | — |
| Viscosity @25° C. (cps) 1 week @120° F., 60% solids | 516 | 417 | 410 | 486 | — | — | — | 350 | — | 345 |
| % Visc. rise after 1 wk. @120° F. | 3% | 18% | 25% | 10% | — | — | — | 17% | — | 19% |
| Gardner Color (w/o drier) | 6 | 6 | 6 | 5 | — | — | — | — | — | — |
| Coating Properties | | | | | | | | | | |
| Appearance | clear high gloss | clear high gloss | clear high gloss | clear high gloss | v.sl.haze high gloss | v.sl.haze high gloss | sl.hazy | clear high gloss | hazy mod. gloss | clear high gloss |
| Tack free time[2] (min.) | 40/50 | 35/45 | 35/40 | 20/25 | 25/35 | 25/50 | 160/210 | 80/260 | 20/27 | 130/390 |
| Hardness @ 0.04 mm | | | | | | | | | | |
| after 1 day | 6B | 6B | 6B | <6B | <6B | 5B+ | <6B | <6B | 4B | <6B |
| after 3 days | 3B | B | B | B— | B | 2B | 2B | 2B— | 3B | 3B— |
| after 10 days | B— | B+ | B | B | B | B | B | 2B | 2B | 2B— |
| after 21 days | B— | B+ | B+ | B+ | B | B+ | HB— | — | 2B+ | — |
| Coating Properties | | | | | | | | | | |
| MEK Resistance (rubs) | | | | | | | | | | |
| after 3 days | 32 | 40 | 37 | 30 | 33 | 30 | 45 | 22 | 26 | 24 |
| after 10 days | 45 | 90 | 80 | 95 | 125 | 70 | 75 | 45 | 41 | 45 |
| after 21 days | 50 | 95 | 85 | 95 | 120 | 95 | 95 | — | 45 | — |
| Forward Impact (Joules) | 2.3 | 1.9 | 1.9 | 1.9 | 1.9 | 1.9 | 1.1 | | 1.7 | |
| Conical Mandrel (1st crack) | 180° | 30° | 70° | 22° | 40° | 21° | — | | 17°(b) | |
| Clev. Cond. Humidity (a) 21 days/2 days | | Mod.#9B. R. over 75% | Few#10B PH.R. over 35% | Dense PH.B. PH.R. over 15% | Mod.#10B. PH.R. over 25% | Few#9B. R. over 75% | Mod.-Dense #10B. R. over 70% | | | |
| QUV Weatherometer (a) 21 days/2 days | | Dense PH.B. PH.R. over 30% | Dense PH.B. PH.R. over 85% | Dense PH.B. PH.R. pver 70% | Dense PH.B. PH.R. over 80% | Dense PH.B. PH.R. over 50% | Mod.#10B. PH.R. over 40% (c) | Dense #10 B+ R over 100% | | |

(a) First time is days of air dry before exposure, second time is exposure time; B. = Blisters, PH. = pinhead, R. = rust
(b) very poor adhesion
(c) 12 days air dry; 2 days exposure in QUV.

Air-drying Unsaturated Coating Compositions—B Series

Air-drying compositions of 70 percent solids are prepared from a solution of an unsaturated oil-modified resin of oil length 32% sold by Cargill under the tradename Alkyd 5700 and the unsaturated melamine condensates of examples 3, 4 and 7. The weight ratio of unsaturated oil-modified resin to unsaturated melamine condensate is 4:1. The compositions contain 0.07 percent cobalt neodecanoate and 0.04 percent manganese octoate based on the solids content. The compositions are coated on phosphate treated steel panels and allowed to dry at room temperature. The coatings are evaluated in comparison with a coating prepared from the unsaturated oil-modified resin alone (Example 0B). The data are set forth in Table 3.

The data show that the unsaturated melamine condensates of examples 3 and 4 reduce the tack free time of the unsaturated oil-modified resin substantially without affecting the low viscosity of the resin solution. In examples 3B, 4B and 7B, the hardness, rate of hardness development and solvent resistance of the oil-modified resin are substantially improved by the unsaturated melamine condensate. As with the A series of coating compositions, the flexibility of the coatings decreases with increase in the ratio of acrylamide moieties to unsaturated fatty acid amide moieties in the unsaturated melamine condensate.

TABLE 3

Evaluation of Air-drying Unsaturated Compositions - B Series

| Coating Composition | OB | 3B | 4B | 7B |
|---|---|---|---|---|
| Formulation Appearance | Clear | Clear | Clear | Clear |
| Formulation Viscosity @ 25° C. | 500 cps | 510 cps | 500 cps | 450 cps |
| Coating Properties | | | | |
| Appearance | Clear High Gloss | Clear High Gloss | Clear High Gloss | Clear High Gloss |
| Tack free time (min.) | 200/220 | 100/135 | 115/150 | 265/290 |
| Thickness range (mm) | 0.03–0.05 | 0.03–0.05 | 0.03–0.05 | 0.03–0.05 |
| Hardness @ 0.04 mm | | | | |
| after 1 day | <6B | <6B | <6B | <6B |
| after 4 days | 4B– | 4B | 4B+ | 4B– |
| after 21 days | 4B+ | 2B+ | 2B+ | 3B |
| MEK Resistance (rubs) | | | | |
| after 4 days | 11 | 13 | 12 | 10 |
| after 21 days | 12 | 23 | 23 | 21 |
| Conical Mandrel (1st crack) | 180° | 20° | 40° | 100° |
| Clev. Cond. Humidity (21 days/10 days) | White; B. & PH. R. over 20% | White; B. & PH. R. over 35% | White; B. & PH. R. over 15% | White; B. & PH. R. over 40% |

Air-drying Unsaturated Coating Compositions—C Series

Air drying compositions of 48 percent solids are prepared from a solution of an unsaturated short soya oil-modified resin sold by Spencer Kellogg under the tradename Aroplaz ® 3252-X-50 and the unsaturated melamine condensates of examples 1, 3, 4, 5 and 10. The weight ratio of unsaturated oil-modified resin to unsaturated melamine condensate is 4:1. A mixed drier containing cobalt, calcium and zirconium salts of fatty acids is added to provide a concentration of 0.04 percent cobalt, 0.2 percent calcium and 0.15 percent zirconium based on the total solids. The solvent consists of 92 weight percent xylene and 8 weight percent methyl ethyl ketone. The compositions are coated on phosphate treated panels and allowed to dry at room temperature. The coatings are evaluated in comparison with a coating prepared from the unsaturated oil-modified resin alone (example 0C). The data are set forth in Table 4. The data show that the unsaturated melamine condensates allowed a substantial decrease in viscosity of the coating composition and increased the rate of hardness development, hardness and solvent resistance without adverse effect on the extremely fast tack-free time.

TABLE 4

EVALUATION OF AIR-DRYING UNSATURATED COMPOSITIONS - C SERIES

| Coating Composition | 0C | 1C | 3C | 4C | 5C | 10C |
|---|---|---|---|---|---|---|
| Formulation Properties | | | | | | |
| Appearance | ALL FORMULATIONS ARE LIGHT AMBER AND CLEAR | | | | | |
| Viscosity (25° C.), initial | 575 cps | 290 cps | 440 cps | 320 cps | 300 cps | 285 cps |
| Viscosity (25° C.), after 1 week @ 120° F. | 850 cps | 440 cps | 800 cps | 480 cps | 460 cps | 445 cps |
| Coating Properties | | | | | | |
| Thickness range (mm) | 0.03–0.05 | 0.03–0.05 | 0.03–0.05 | 0.03–0.05 | 0.03–0.05 | 0.03–0.05 |
| Tack free time$^2$ (min.) | 15/19 | 13/18 | 11/15 | 16/19 | 17/21 | 18/22 |
| Hardness | | | | | | |
| after 1 day | <6B | <6B | <6B | <6B | <6B | <6B |
| after 4 days | 4B | 2B | 2B | 3B+ | 2B | 3B |
| after 21 days | 2B+ | B+ | B+ | B+ | B+ | B+ |
| MEK Resist. (rubs) | | | | | | |
| after 4 days | 10 | 14 | 14 | 14 | 14 | 14 |
| after 21 days | 36 | 45 | 45 | 60 | 45 | 42 |
| Conical Mandrel (after 21 days) | 7° | 6° | 6° | 7° | 8° | 10° |
| Forward Impact, Joules (after 21 days) | 1.8 | 1.7 | 1.4 | 1.6 | 1.8 | 1.6 |
| Clev. Cond. Humidity(after 15 day exposure 21 days) | White; dense PH.B., PH.R. over 1% | White; dense PH.B., 0%R. | White; dense PH.B., 0%R. | White; dense PH.B., 0%R. | White; dense PH.B., 0%R. | White; dense PH.B., 0%R. |

Air-drying Unsaturated Coating Compositions—D Series

Air-drying compositions of 48 percent solids are prepared from a solution of an unsaturated medium soya oil-modified resin sold by Spencer-Kellogg under the tradename Aroplaz ® 1082-M-50 and the unsaturated melamine condensates of examples 1, 3, 5, 10 and 11. The weight ratio of unsaturated oil-modified resin to unsaturated melamine condensate is 4:1. A mixed drier containing cobalt, calcium and zirconium salts of fatty acids is added to provide a concentration of 0.05 percent cobalt, 0.17 percent calcium and 0.11 percent zirconium based on the total solid. The solvent consists of 74 weight percent mineral spirits, 18 weight percent xylene and 8 weight percent methyl ethyl ketone. The compositions are coated on phosphate treated steel panels and allowed to dry at room temperature. The coatings are evaluated in comparison with a coating containing Aroplaz 1082-M-50 resin alone (example 0D). The data are set forth in Table 5. The data show that the unsaturated melamine condensates generally reduce the viscosity of the coating composition and increase the rate of hardness development, the hardness, the solvent resistance of the coatings and humidity resistance of the coatings without much effect on the tack-free time.

TABLE 5

| EVALUATION OF AIR-DRYING UNSATURATED COMPOSITIONS - D SERIES | | | | | | |
|---|---|---|---|---|---|---|
| Coating Compositions | 0D | 1D | 3D | 5D | 10D | 11D |
| Formulation Properties | | | | | | |
| Appearance | ALL FORMULATIONS ARE LIGHT AMBER AND CLEAR | | | | | |
| Visc. (25° C.), initial | 460 cps | 210 cps | 460 cps | 150 cps | 150 cps | 370 cps |
| Visc. (25° C.), after 1 week @ 120° F. | 550 cps | 240 cps | 590 cps | 160 cps | 200 cps | 575 cps |
| Coating Properties | | | | | | |
| Thickness range (mm) | 0.03–0.05 | 0.03–0.05 | 0.03–0.05 | 0.03–0.05 | 0.03–0.05 | 0.03–0.05 |
| Tack free time[2] (min.) | 180/220 | 180/220 | 310/340 | 225/240 | 210/225 | 210/225 |
| Hardness @ 0.03 mm | | | | | | |
| after 1 day | <6B | <6B | <6B | <6B | <6B | <6B |
| after 3 days | <6B | 2B | 5B | 2B– | 3B | 3B |
| after 21 days | 2B-3B | B | B | B | B | B |
| MEK Resistance (rubs) | | | | | | |
| after 10 days | 45 | 65 | 85 | 85 | 90 | 85 |
| after 21 days | 50 | 150 | 150 | 175 | 150 | 155 |
| Conical Mandrel[3] (21 d) | >180° | >180° | >180° | >180° | >180° | >180° |
| Clev.Cond. Humidity[4] (12 days) | | | | | | |
| 3 day exposure | Dense #10B. R. over 80% | Few #10B. PH.R.over 50% | Few #10B. PH.R.over 60% | Few #10B. PH.R.over 40% | Few #10B. PH.R.over 25% | Dense PH.B. PH.R.over 15% |

Air-drying Unsaturated Coating Compositions—E Series

An unsaturated ester of a styrene allyl alcohol copolymer is prepared by esterifying a styrene allyl alcohol copolymer of average molecular weight 1600 containing 5.3 moles hydroxyl per molecule, sold by Monsanto Company under the registered trademark RJ-100, with a mixture of 1.9 moles castor fatty acids and 2.0 moles linseed fatty acids per mole of styrene allyl alcohol copolymer.

Air-drying coating compositions of 80 percent solids are prepared by blending the unsaturated ester with the unsaturated melamine condensates of examples 3 and 5. Weight ratios of unsaturated ester to unsaturated melamine condensate are 4:1 and 3:2. Fatty acid salts and fatty acid salts combined with t-butylhydroperoxide are used as cure catalysts. The unsaturated melamine condensates decrease the tack-free time of the unsaturated ester substantially especially when they are present as 40 percent of the resin solids and the system is cured with fatty acid salt and hydroperoxide, and improve the coating hardness, solvent resistance and flexibility.

EXAMPLE 17

A coating formulation containing the unsaturated medium soya oil-modified resin of the D-series and the unsaturated melamine condensate of Example 2 in the weight ratio of 60 to 40 is prepared as a 48 percent solids solution in a solvent consisting of 91 weight percent xylene and 9 weight percent methyl ethyl ketone. A mixed cobalt, calcium and zirconium drier is added. The coating formulation is applied to phosphate treated steel panels and dried in air. The hardness of the coating increases from <6B to B in 21 days. The methyl ethyl ketone rub test value is 90 after 10 days and 125 after 21 days.

EXAMPLE 18

A coating formulation containing the oil-modified unsaturated resin of Example 1A and the unsaturated melamine condensate of Example 4 in the weight ratio of 60 to 40 is prepared as a 70 percent solids solution in a solvent consisting of 60 weight percent xylene and 40 weight percent methyl ethyl ketone. A mixed cobalt zirconium drier is added. The coating formulation is applied to phosphate treated steel panels and dried in air. The hardness of the coating increases from 6B to HB in 21 days. The methyl ethyl ketone rub test value is 80 after 10 days and 140 after 21 days.

EXAMPLE 19

A coating formulation containing the oil-modified unsaturated resin of Example 1A and the unsaturated melamine condensate of Example 3 in the weight ratio of 90 to 10 is prepared as a 70 percent solids solution in a solvent consisting of 90 weight percent xylene and 10 weight percent methyl ethyl ketone. A mixed cobalt lithium drier is added. The coating formulation is applied to phosphate treated steel panels and dried in air. The hardness of the coating increases from 5B to HB in 21 days. The methyl ethyl ketone rub test value is 75 after 10 days and 130 after 21 days.

EXAMPLE 20

A coating formulation containing the oil-modified unsaturated resin of Example 1A and the unsaturated melamine condensate of Example 9 in the weight ratio of 70 to 30 is prepared as a 70 percent solids solution in a solvent consisting of 70 weight percent xylene and 30 weight percent methyl ethyl ketone. A mixed cobalt manganese drier is added. The coating formulation is applied to phosphate treated steel panels and dried in air. The hardness of the coating increases from <6B to 2B in 21 days. The methyl ethyl ketone rub test value is 60 after 10 days and 90 after 21 days.

EXAMPLE 21

A coating formulation containing the oil-modified unsaturated resin of Example 1A and the unsaturated melamine condensate of Example 9 in the weight ratio of 70 to 30 is prepared as a 70 percent solids solution in a solvent consisting of 70 weight percent xylene and 30 weight percent methyl ethyl ketone. A mixed cobalt zirconium drier is added. The coating formulation is applied to phosphate treated steel panels and dried in air. The hardness of the coating increases from 6B to HB in 21 days. The methyl ethyl ketone rub test value is 100 after 10 days and 140 after 21 days.

What is claimed is:

1. An unsaturated condensate of a methylolmelamine, an acrylamide, an ethylenically unsaturated fatty acid amide and a $C_1$ to $C_{10}$ alcohol wherein the methylolmelamine has at least about 5 methylol groups per melamine ring, wherein substantially all the methylol groups are condensed with the acrylamide, the unsaturated fatty acid amide or the alcohol, wherein the number of the acrylamide moieties of the condensate is in the range of about 1 to about 4 per melamine ring and the number of unsaturated fatty acid amide moieties is in the range of about 0.5 to about 2 per melamine ring, wherein the ratio of the acrylamide moieties to unsaturated fatty acid amide moieties is in the range of about 1:1 to about 3:1 and wherein the unsaturated fatty acid amide is an amide of ammonia or methylamine and an ethylenically unsaturated fatty acid containing from 4 to 32 carbon atoms and at least one allylic hydrogen atom per fatty acid moiety.

2. The unsaturated condensate of claim 1 wherein the acrylamide is represented by the formula:

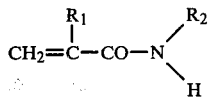

wherein $R_1$ and $R_2$ are selected from the group consisting of hydrogen and methyl.

3. The unsaturated condensate of claim 2 wherein $R_1$ and $R_2$ are hydrogen.

4. The unsaturated condensate of claim 2 or 3 wherein the unsaturated fatty acid contains from ten to twenty carbon atoms.

5. The unsaturated condensate of claim 2 or 3 wherein the unsaturated fatty acid comprises at least about 5 weight percent of polyunsaturated acid.

6. The unsaturated condensate of claim 4 wherein the unsaturated fatty acid comprises at least about 5 weight percent of polyunsaturated acid.

7. The unsaturated condensate of claim 5 wherein the alcohol is a $C_1$ to $C_4$ alcohol.

8. The unsaturated condensate of claim 6 wherein the alcohol is a $C_1$ to $C_4$ alcohol.

9. The unsaturated condensate of claim 5 wherein the alcohol is methyl alcohol.

10. The unsaturated condensate of claim 6 wherein the alcohol is methyl alcohol.

11. An unsaturated condensate of a methylolmelamine, acrylamide, an ethylenically unsaturated fatty acid amide and a $C_1$ to $C_4$ alcohol, wherein the methylolmelamine has at least about 5 methylol groups per melamine ring, wherein substantially all the methylol groups are condensed with acrylamide, the unsaturated fatty acid amide or the alcohol, wherein the number of acrylamide moieties of the condensate is in the range of about 1 to about 3 per melamine ring, and the number of unsaturated fatty acid amide moieties is in the range of about 0.75 to about 1.5 per melamine ring, wherein the ratio of acrylamide moieties to unsaturated fatty acid amide moieties is in the range of about 1:1 to about 3:1, and wherein the amide is a primary amide of an ethylenically unsaturated fatty acid containing from 10 to 20 carbon atoms and at least one allylic hydrogen atom per fatty acid moiety.

12. The unsaturated condensate of claim 11 wherein the unsaturated fatty acid comprises at least about 5 weight percent of a polyunsaturated acid.

13. The unsaturated condensate of claim 11 wherein the unsaturated fatty acid comprises at least about 10 weight percent of a polyunsaturated acid.

14. The unsaturated condensate of claim 11, 12 or 13 wherein the alcohol is methyl alcohol.

15. The unsaturated condensate of claim 11, 12 or 13 wherein the unsaturated fatty acid is selected from the group consisting of oleic, linoleic and linolenic acids.

16. A process for the preparation of an unsaturated condensate which comprises condensing an alkoxymethylmelamine with an acrylamide and an ethylenically unsaturated fatty acid amide under acid conditions and in the presence of an oxidation and polymerization inhibiting quantity of an inhibitor until an amount of alcohol equivalent to the acrylamide and the unsaturated fatty acid amide is evolved, wherein the alkoxymethylmelamine has a combined ratio of formaldehyde to melamine in the range of about 5:1 to about 6:1 and a combined ratio of alcohol to melamine in the range of about 4.7 to about 6.0 moles per mole of melamine, wherein the mole ratio of the acrylamide to the alkoxymethylmelamine is in the range of about 1:1 to about 4:1, wherein the mole ratio of the unsaturated fatty acid amide to the alkoxymethylmelamine is in the range of about 0.5:1 to about 2:1, wherein the mole ratio of the acrylamide to the unsaturated fatty acid amide is in the range of about 1:1 to about 3:1 and wherein the unsaturated fatty acid amide is an amide of ammonia or methylamine and an unsaturated fatty acid containing from 4 to 32 carbon atoms and at least one allylic hydrogen atom per fatty acid moiety.

17. The process of claim 16 wherein the mole ratio of the acrylamide to the alkoxymethylmelamine is in the range of about 1:1 to about 3:1 and the mole ratio of the unsaturated fatty acid amide to the alkoxymethylmelamine is in the range of about 0.75 to about 1.5.

18. The process of claim 17 wherein the unsaturated fatty acid contains at least about 5 weight percent of a polyunsaturated fatty acid.

19. The process of claim 18 wherein the unsaturated fatty acid contains from 10 to 20 carbon atoms per molecule.

20. The process of claim 19 wherein the unsaturated fatty acid contains at least about 10 weight percent of a polyunsaturated fatty acid.

21. The process of claim 20 wherein the alkoxymethyl melamine is a methoxymethylmelamine.

22. The product of the process of claim 15, 16, 17, 18, 19, 20 or 21.

* * * * *